United States Patent [19]

Krikorian et al.

[11] Patent Number: 4,954,830
[45] Date of Patent: Sep. 4, 1990

[54] RANGE RESOLVING METHOD

[75] Inventors: Kapriel V. Krikorian; Robert A. Rosen, both of Los Angeles; Frank K. Li, Rancho Palos Verdes, all of Calif.

[73] Assignee: Hughes Aircraft Company, Los Angeles, Calif.

[21] Appl. No.: 74,578

[22] Filed: Sep. 14, 1979

[51] Int. Cl.⁵ .............................................. G01S 13/12
[52] U.S. Cl. ..................................... 342/137; 342/145
[58] Field of Search ............... 343/5 UQ, 17.1 PF; 342/136, 137, 145

[56] References Cited

U.S. PATENT DOCUMENTS

| | | | |
|---|---|---|---|
| 3,765,017 | 10/1973 | Dentino | 342/137 |
| 4,015,261 | 3/1977 | Campbell | 343/17.1 PF X |
| 4,057,800 | 11/1977 | Ganz | 343/17.1 PF X |
| 4,106,019 | 8/1978 | Alexander et al. | 342/137 |
| 4,143,373 | 3/1979 | Chernick | 343/17.1 PF |

Primary Examiner—Thomas H. Tarcza
Assistant Examiner—Gilberto Barrón, Jr.
Attorney, Agent, or Firm—William J. Streeter; Mark J. Meltzer

[57] ABSTRACT

A method is provided for calculating the unambiguous ranges of a radar target in a radar system employing multiple PRFs. The radar system provides digitized data items indicative of return signals in each of a plurality of range intervals for each PRF. A base PRF is selected and a range interval containing a target return signal is selected therefrom. This range interval is correlated with particular range intervals of the remining PRFs to find specific target return signals therefrom which satisfy a first predetermined relationship. This relationship generally provides that a target is identified if a preselected number of correlated range intervals of all PRFs have target return signals therein. If this relationship is satisfied, the target range is calculated from a range equation.

17 Claims, 6 Drawing Sheets

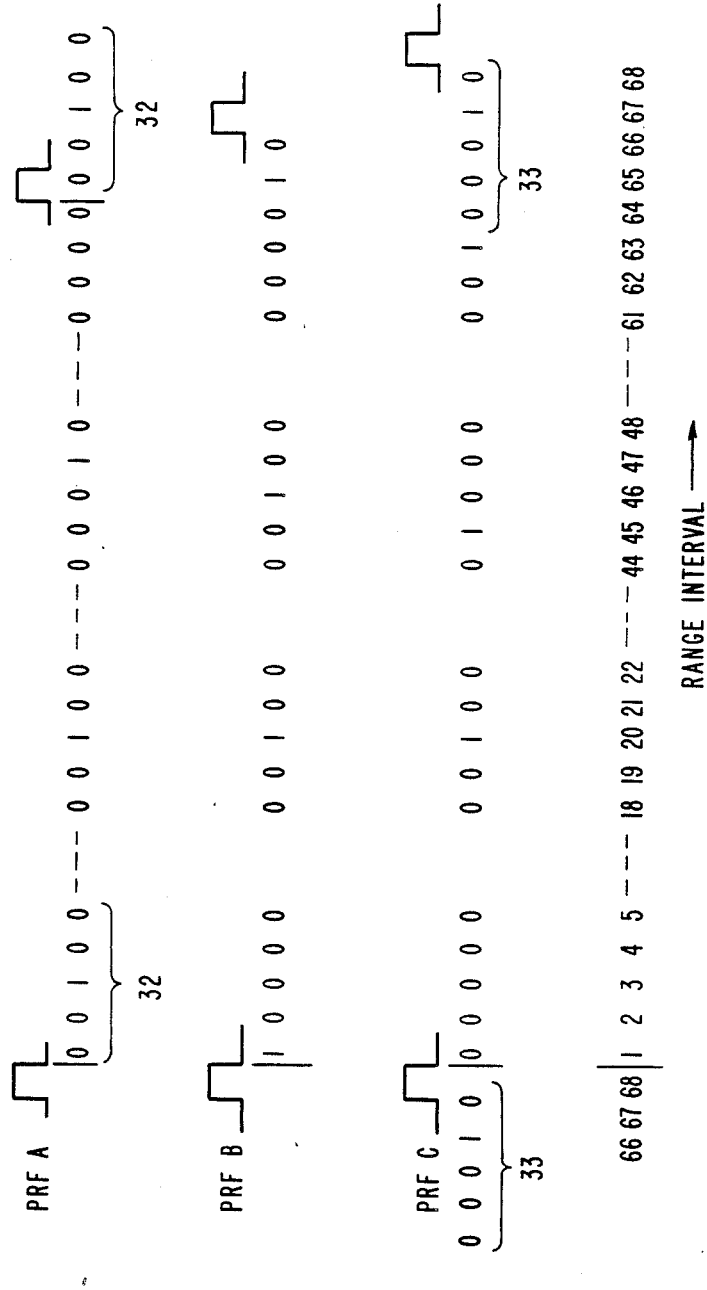

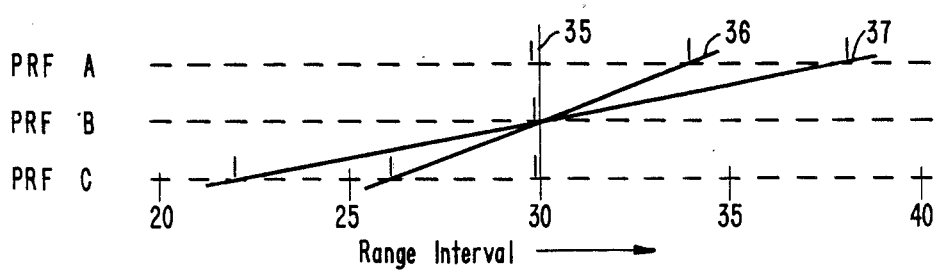
Fig. 3.
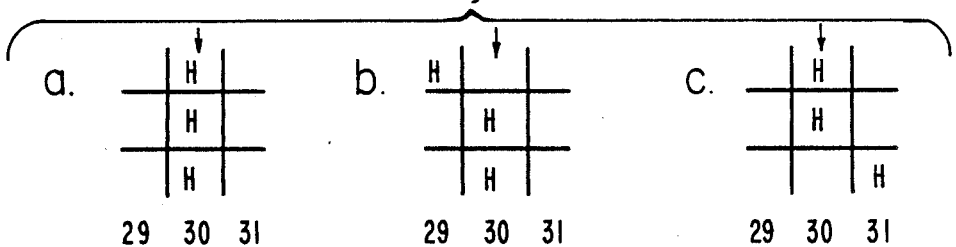
Fig. 6.
Fig. 7.
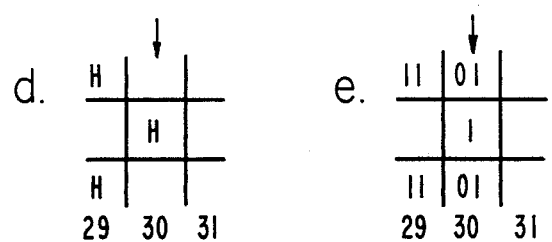
Fig. 8.

RANGE RESOLVING METHOD

The present invention relates generally to methods for resolving range ambiguities in radar systems, such as medium and high pulse repetition frequency (PRF) doppler radar systems, for example.

The government has rights in this invention pursuant to Contract No. F33657-73-C-0267 awarded by the U.S. Air Force.

BACKGROUND OF THE INVENTION

In radar systems, the range of a target is proportional to the time between a transmitted pulse and target return signal. In medium and high PRF systems, range ambiguities arise because the particular transmitted pulse to which the target return signal is associated is unknown. The range ambiguity problem may be resolved by use of multiple PRFs, as generally discussed in Skolnick, "Introduction to Radar Systems", McGraw Hill, New York, 1962.

More recent multiple PRF range resolving techniques include such schemes as the Chinese remainder theorem or the shift register approaches. The Chinese remainder theorem approach is described in Skolnick, "Radar Handbook", section 19, pp. 19–16, McGraw Hill, 1970. To calculate target range by using the Chinese remainder theorem, all combinations of target return signals in one ambiguous range interval for each PRF must be examined for the existence of a consistent unambiguous range. The number of combinations which must be examined increases as a function of the number of target return signals raised to the power determined by the number of PRFs. A typical computer loading equation for the Chinese remainder theorem approach, which provides an indication of the number of computations required by the electronics, is given by $2N^2(4+5N)$, for a three PRF system, where N is the number of range intervals between transmissions. Table 1 below shows the number of computations required as a function of the number of target return signals using the Chinese remainder theorem approach.

The shift register technique cyclically shifts quantized tables of target return signals for each PRF, and when target return signals appear simultaneously at the top of each table, an unambiguous target range is determined. The number of computations performed is proportional to the number of range intervals in the maximum unambiguous range. The number of computations required for the shift register approach is generally given by the equation $JT + 18NT$, for a three PRF system, where J is the number of range intervals between transmissions, and T is the number of ambiguous range zones in the maximum unambiguous range. Table 1 also shows the number of computations required for the shift register technique with respect to the number of targets viewed by the radar system.

| Number of Targets | Computations Chinese | Shift Reg. |
|---|---|---|
| 1 | 18 | 1260 |
| 3 | 342 | 1800 |
| 5 | 1450 | 2340 |
| 10 | 10800 | 3690 |

Thus, in conventional techniques, the number computations increases more rapidly than the number of targets. With present digital signal processors, it is computationally inefficient in terms of equipment and/or time to perform either of the above two conventional techniques, and a method which exhibits reduced loading requirements would be a significant advance in the art.

SUMMARY OF THE INVENTION

Accordingly, it is an object of the present invention to provide a method of range resolution which is less complex, computationally faster and uses less storage than previously known techniques.

It is a further object of the present invention to provide a range resolution method which allows for flexible PRF selection and low range error rate.

In accordance with the present invention there is provided a method for determining the unambiguous range of a radar target for use in a radar system employing multiple PRFs. The radar system provides digitized data items indicative of return signals from each of a plurality of range intervals for each PRF which are used in the computation of target range by the present method. For example, a "one" signal indicates the presence of a target, and a "zero" signal indicates the absence thereof. The method comprises the steps of selecting one of the PRF's as a base PRF and selecting a range interval having a digitized target return signal (a "one" signal) therein. This selected range interval is correlated with particular range intervals of the remaining PRFs in a predetermined manner to find the specific signals therefrom which satisfy a first predetermined relationship therebetween. The target range is then calculated based on a second predetermined relationship and the information obtained in the above steps. The correlation and range calculating steps are performed for each of the remaining range intervals of the base PRF having digitized target return signals therein.

The correlation by means of the first predetermined relationship determines the presence or absence of a target and the second predetermined relationship calculates the range associated with the target. The correlation is accomplished by identifying the range interval of the base PRF in which the selected digitized target return signal is present. The same range interval in the remaining PRFs is then checked for the presence of target return signals therein. The base PRF range interval is then checked against the remaining range intervals of the plurality of PRFs. The specific range intervals which are checked in any particular PRF is determined by the difference in range intervals between the base PRF and that particular PRF. If target return signals exist in a predetermined number of PRFs checked in any correlation, a target is identified. The second predetermined relationship is generally defined by the range equation $R = B + N_r n$, wherein R is the target range in range intervals, B is the range interval of the selected target return signal of the base PRF, and $N_r$ is the number of range intervals associated with the base PRF. The quantity n is equal to the difference between the range interval of a target return signal in one of the remaining PRFs minus the range interval of the selected target return signal of the base PRF, divided by the difference in range intervals employed by that one PRF and the base PRF.

In one disclosed embodiment, three PRFs are used in which the number of range intervals in the second and third PRFs differ from that of the base PRF by an equal amount therebetween. The base PRF employs 66 range intervals while the second and third PRFs have 64 and 68 range intervals associated therewith. The correlation is accomplished by examining return signals from preselected range intervals of the second and third PRFs which have an equal and opposed relation to the selected target return signal range interval of the base PRF, and are separated therefrom by K range intervals, where K is an integer multiple of two. The second predetermined relationship is generally defined by the range equation: $R=B+N_r n'$, where n' is equal to $K/2$.

BRIEF DESCRIPTION OF THE DRAWINGS

The foregoing and other objects and features of the present invention may be more readily understood with reference to the following detailed description taken in conjunction with the accompanying drawings, wherein like reference numerals designate like structural elements, and in which:

FIG. 2 illustrates the type of data for the various PRFs utilized in the methods of the present invention;

FIG. 3 presents target data useful in explaining the present methods and in calculating range values therefrom;

FIG. 6 illustrates a digitizing technique for use with the present method which compensates for range interval straddling by target return signals;

FIGS. 7a thru 7e illustrate acceptable target patterns in accordance with one embodiment of the present invention;

FIGS. 8a thru 8c represent non-acceptable target patterns in accordance with one embodiment of the present invention.

DETAILED DESCRIPTION

Figure 1:
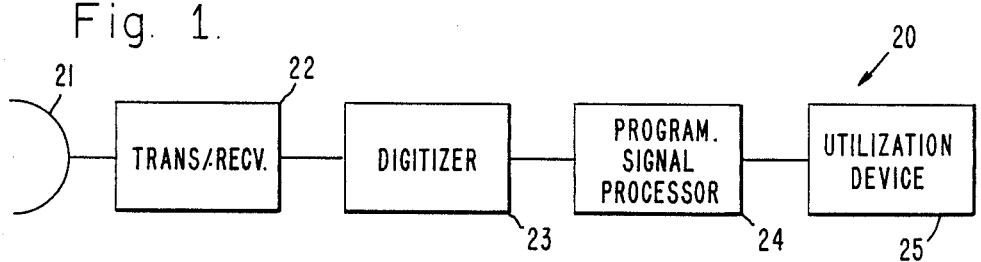
FIG. 1 is a block diagram of a pulsed doppler radar system which implements multi-PRF range resolution methods in accordance with the present invention.

Refering to FIG. 1 there is shown a pulsed doppler radar system 20 utilizing multiple PRFs and employing the range resolution method of the present invention. The system 20 includes an antenna 21 for transmitting and receiving energy in a preselected frequency band, a transmitter receiver section 22, a digitizer 23 for transforming analog radar signals into digital signals, a programmable signal processor 24, for processing the digitized radar signals, and a utilization device 25, such as a radar display, for making use of the processed radar signals.

The transmitter of section 22 transmits a multiplicity of energy pulses, such as on the order of 2,000 or so, at each PRF in a sequential manner. At some time after a transmit pulse, a target return signal is received from that pulse and accordingly from all transmit pulses subsequent thereto in any PRF. All target return signals for each PRF are integrated over the multiplicity of pulses and a set of digitized signals is provided for each PRF.

The radar system 20 of FIG. 1 may, for example, employ three PRFs, identified herein as A, B, and C. The interpulse period of each PRF is divided up into range intervals or range bins. The three PRF's differ in their values, but the number of range intervals for each PRF differs by an equal number. The radar system 20 herein provides PRF A with 64 range intervals in the interpulse period thereof; PRF B has 66; and PRF C has 68. This is illustrated in FIG. 2.

The programmable signal processor 24 implements the range resolving method of the present invention as well as various functions which are ancillary thereto. The various functions may be mechanized by means of any one of a number of prior art techniques and therefor need not be explained in detail herein. The programmable signal processor 24 implements standard processing techniques well-known in the art, such as filtering, by means of a fast Fourier transform technique, noise estimation, and thresholding, and the like.

Thus, return signals are received and integrated over the total number of transmit pulses to provide a single item of data for each PRF. The return signals comprise a set of ones and zeros indicative of the presence or absence, respectively, of targets in a plurality of range intervals for each PRF. For example, targets may be indicated in range intervals 3, 20 and 47 for PRF A, range intervals 1, 20, 46 and 65 for PRF B and range intervals 20, 45, 63 and 67 for PRF C, as indicated in FIG. 2.

The range resolution function implemented by the programmable signal processor 24 may be considered to include three memory modules which in turn are connected to a computational unit. Each memory module is designated to store the individual digitized data item of one of the PRFs. The PRF A memory section stores the digitized data item of 64 words associated with the 64 range intervals of that PRF. In addition, the PRF A memory module stores a plurality of range interval words at the end thereof obtained from the beginning of the data item, such additional words being identified by bracket 32. The number of words which are additionally added to the memory storage is determined by the maximum range of the system in terms of turnovers times the numerical difference between the number of range intervals associated with the A and B PRFs. As the term is used herein, a turnover is equal to the radar range equivalent of the time between radar transmissions and is the same as the ambiguous range of the system. T is defined as the number of turnovers in the system's maximum range. For example, if the radar range between transmission pulses is 5 miles and the system's maximum range is 100 miles, then T is 20. For the system herein, the maximum range may be obtained by, say, 15 turnovers, and the difference in range intervals is two $(66-64=2)$. Thus the total number of words added to the A memory is 30; $(66-64)\times 15=30$.

Similarly, the PRF C memory section stores a digitized data item of 68 words associated with the 68 range intervals of that PRF, and additionally stores 30 additional words at the beginning thereof obtained from the end of the data item as identified by bracket 33. The 30 words is determined by multiplying the difference in range intervals between the B and C PRFs times the number of turnovers that determines the maximum range; $(68-66)\times 15=30$. The B PRF, or base PRF, having 66 range intervals has only the range intervals thereof stored which have target return signals present therein. Thus, for instance, the B memory stores a digitized target return signal representing range intervals 1, 20, 46, 65, and does not store all 66 digitized return signals as does the A and C memorys.

Once the data is stored in the A, B and C memories, it is utilized by the computational section of the programmable signal processor 24. Each of the target return signal stored in the B memory is correlated with the target return signal stored in the A and C memories to see if they satisfy a first predetermined relationship therebetween. A better understanding of this correlation process may be obtained with reference to FIG. 3.

FIG. 3 shows a representation of a target return signal pattern for three PRFs in terms of the range intervals in which each target return signal is received. Thus, for example, target return signals are detected in range intervals 30, 34 and 38 for PRF A (identified by ones); range interval 30 for PRF B; and range intervals 22, 26 and 30 for PRFC. The remaining range intervals of the A and C PRFs has zeros therein. Three straight lines 35–37 are shown which illustrate geometrically the correlation performed by the present method.

In essence, the correlation is performed in the following manner. A target return signal is identified in range interval 30 of PRF B, the base PRF. Then, range intervals 30 of the A and C PRFs are checked to see if target return signals are present therein. In the example of FIG.3, target return signals are present, and a target is designated. The range R of the target in range intervals may then be calculated from the range equation $R = B + N_r \cdot n'$, where B is the range interval of the base PRF having an identified target return signal therein, and $N_r$ is the number of the range intervals associated with the base PRF. The quantity n' is the difference in range intervals between the target return signal locations in the A and B PRFs divided by the difference in range intervals between the A and B PRFs, or between the target return signal locations in the B and C PRFs divided by the difference in range intervals between the B and C PRFs. In the first example all target return signals are in range interval 30 for each PRF, so n'=0. Thus the range R=30 range intervals. This number may then be transformed into a true distance measurement by appropriate multiplicative factors.

Next, with reference to the same target return signal in range interval 30 of PRF B, range intervals 32 of PRF A and 28 of PRF C are checked to determine if the proper target correlation is present. In the example, it is not, and the correlation process continues a predetermined number of times determined by the total number of turnovers required for the maximum range.

As the sequence progresses the correlation identified by the second straight line 36 exists with target return signals identified in range intervals 34, 30 and 26 of PRFs A, B and C, respectively. Once the target identification is made, the range calculation is performed which yields a range of $R = 30 + (66 \cdot 4/2) = 162$ range intervals. The correlation check continues until finally reaching the target indicated by straight line 37. The range associated with this target is $R = 30 + (66 \cdot 10/2) = 360$ range intervals. The correlation would continue for the remainder of range intervals numerically equivalent to the number of turnovers at the maximum range, for example, 15, with reference to the FIG. 2 discussion hereinabove.

By way of summary, the correlation of the present method is accomplished by identifying the range interval or the base PRF in which a target return signal is present. The same range interval locations in the A and C PRFs are checked to determine the presence of target return signals therein. The range interval locations in the A and C PRFs are then incremented and decremented respectively by a number of range intervals equal to the difference between range intervals in the A and C PRFs and the base PRF. In the specific embodiment, the difference in PRF range intervals is 2 and so PRF A is incremented by 2 and PRF C is decremented by 2. Accordingly, if the number of range intervals in a PRF is less than that of the base PRF, the correlation procedure increments the range intervals, and vice versa for a PRF whose number of range intervals is greater than that of the base PRF. If target return signals are present in all PRFs, a target is identified and the range calculated.

In general, the range is given by the equation $R = B + N_r \cdot n$, where R is the target range in range intervals, B is the range interval of the target return signal in the B PRF, and $N_r$ is the number of range intervals in the base PRF. The quantity n is equal to the difference the range interval of a target return signal in any particular PRF minus the range interval of the target return signal in the base PRF, divided by the difference in range intervals between that particular PRF and the base PRF. In particular, with reference to the specific embodiment, n is given by $n' = K/2$, where K is the difference in range intervals of target return signals in either the A or C PRF and the base PRF, and K is an integer multiple of two.

Figure 4:
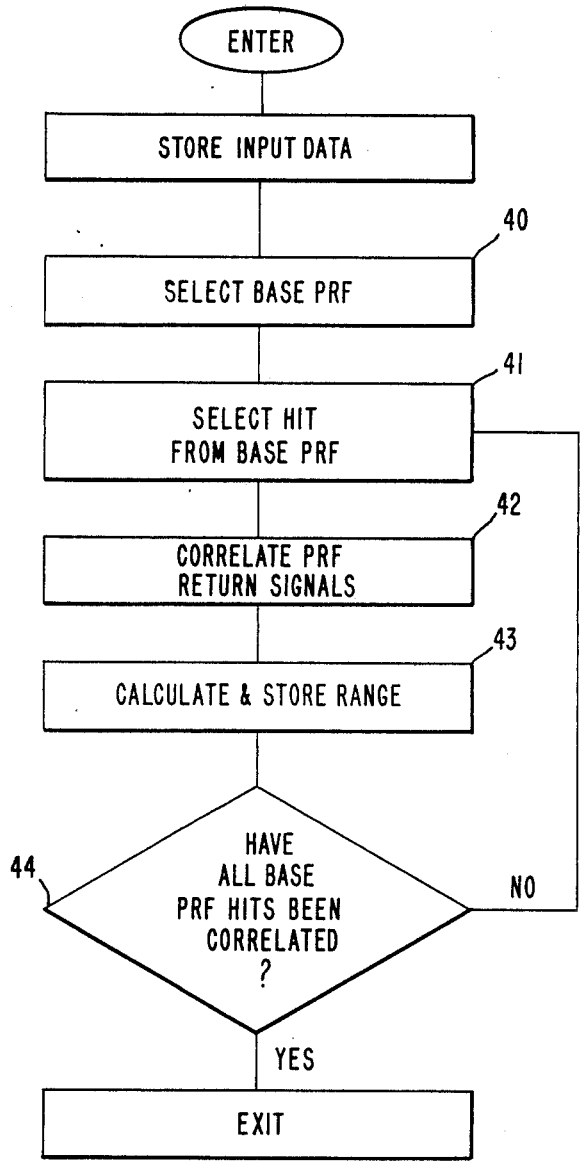
FIG. 4 illustrates a basic computational scheme or flow diagram which implements the methods of present invention.

Accordingly, and with reference to FIG. 4, the method of the present invention includes the first step 40 of selecting a base PRF from the plurality of PRFs utilized by the radar system. A target return signal, or hit, from the base PRF is selected in the second step 41. In this third step 22, target return signals from the remaining PRFs are correlated with the target return signal of the base PRF to determine the existence of a true target. Once a target is identified, the fourth step 43 calculates and stores the range of the target for use by the utilization device 25 of FIG. 1. The fifth step 44 provides for repeating the above steps for each of the remining target return signals of the base PRF.

Figure 5:
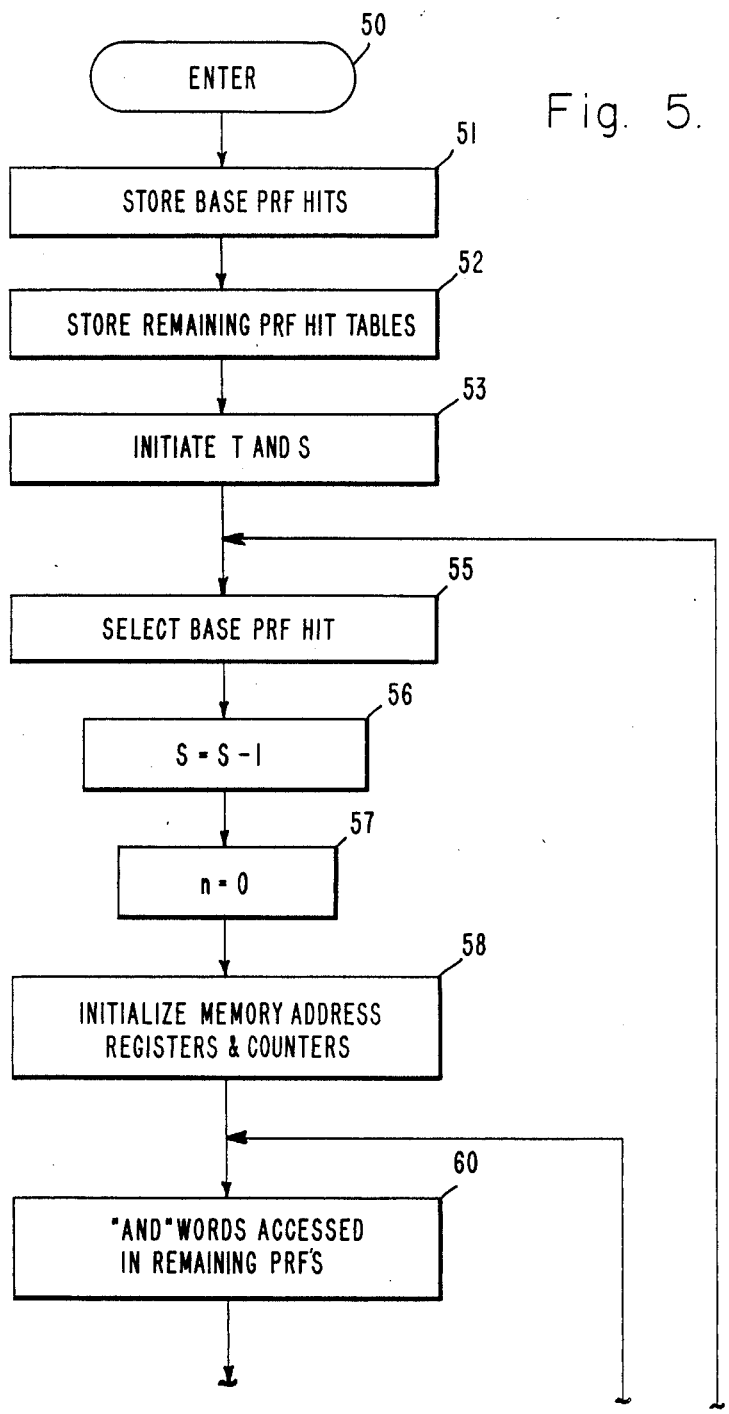
FIG. 5 illustrates a more detailed flow diagram which implements the methods of the present invention.
Figure 5:
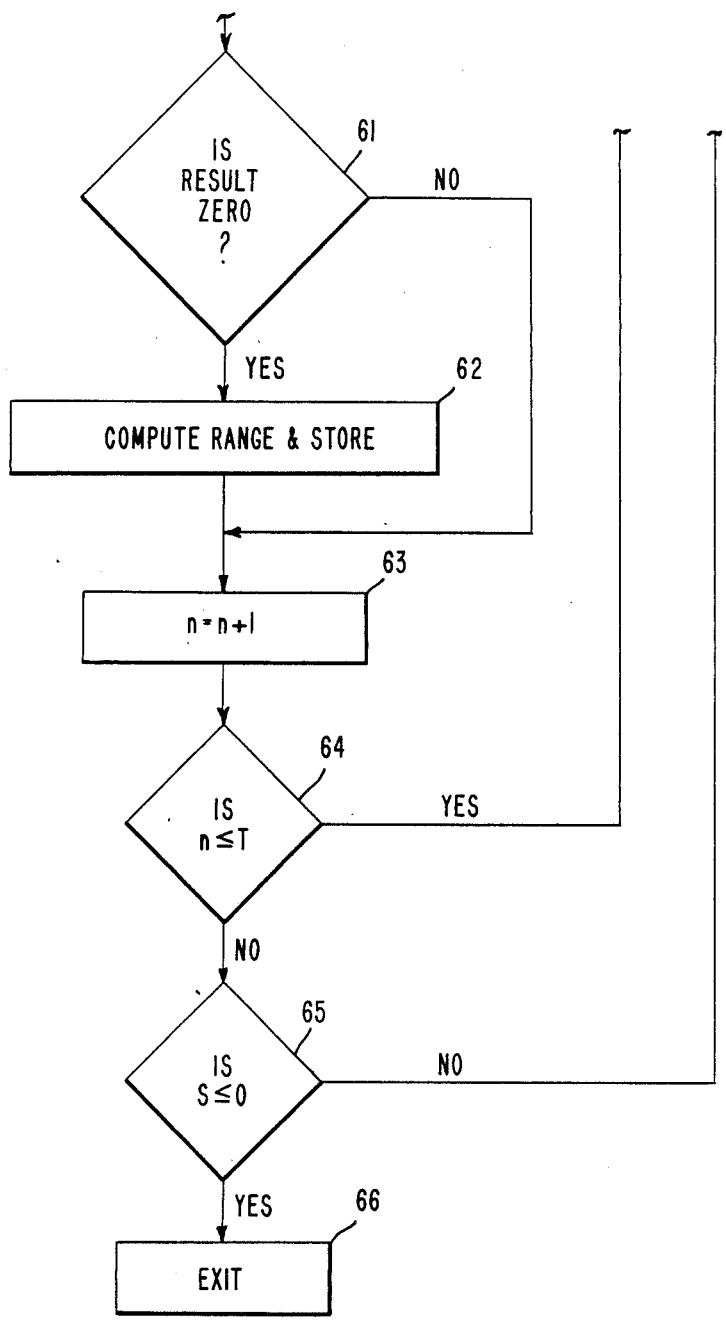

One means of implementing the correlation and range calculation method of the present invention is by means of a computer program, a flow diagram thereof being shown in FIG. 5. After providing an enter command 50, step 51 stores the return signal data for the remaining PRFs. Step 53 initializes counters T and S, where T is the number of turnovers which determine the maximum range, and S is the number of target return signals or hits identified in the base PRF.

The actual calculation process is started at step 55 whereby one of the target return signals or hits is selected. S is decremented by one in step 56 and a counter, n, is initialized at zero at step 57. Step 58 initializes the memory address registers and counters of the programmable signal process 24 which access the storage areas and direct the data flow and computation.

Steps 60–62 accesses the remaining PRFs and logically "ANDS" the data words located in the range intervals having the same numerical location to determine if a target is present. If one is determined, the range is calculated. Steps 63 and 64 increment the n counter and compare it with T, the total number of turnovers for maximum range. If n<T then steps 60–64 are repeated. Once n exceeds T, S is compared with zero in step 65 to see if all of the base PRF targets have been calculated. If all targets have been determined, the program exits at step 66. Otherwise, the program loops to step 55 to obtain a new base PRF target return signal, and the range calculation process continues. The flow chart herein and computation implemented thereby is identical to the computations described with reference to FIGS. 2 and 3 hereinabove.

The present method may also provide for the possibility that one of the target return signals in the A PRF, for instance, may not be located in a range interval directly opposite that of the C PRF, or vice versa. With reference to FIG. 6, the present method may employ a digitizing scheme which provides for two bit digital signals to identify the range intervals associated with the target return signs and the adjacent range intervals. For example, FIG. 6 shows the digitized pattern associated with this scheme. The digital word "11" is assigned to the range interval in which a target return signal is located. The range interval to the left is assigned a "10" word and the range interval to the right is assigned a "01" word. These arrangements are provided only in the A and C PRFs. A target is designated if the A and C PRF words are logically "ANDED" along a line and a non-zero value is obtained in the result.

A better understanding of this may be obtained with reference to FIGS. 7 and 8. FIG. 7 illustrates identified target configurations, while FIG. 8 illustrate non-identified target configurations. The range intervals which are logically "ANDED" are along the vertical column designed by the arrows.

FIG. 7a represents a target return pattern having the return signals registered in identically numbered range intervals of PRFs A, B, and C. The three target return signals line up in a straight line in the geometric representation. The range intervals of PRFs A and C having H's identified therein have a "11" digital word associated therewith. Accordingly, the logical "ANDING" process provides 11∧11=11 and a target is designated. As to FIG. 7b, a target return signal is identified in range interval 29 of PRF A and in range interval 30 of PRF C. Thus PRF A has a "01" in range interval 30, while PRF C has a "11" in range interval 30. Therefore, the "ANDING" process yields 01∧11=01, and a target is designated. FIG. 7c yields the same results, but with PRF A having a "11" in range interval 30 and PRF C having a "10". Thus 11∧10=10, and a target is designated.

FIGS. 7d and 7e represent the same target return pattern, but with FIG. 7e showing the complete digital representation. Both the A and C PRF target return signals are shifted by one range interval and are registered in range intervals 29 of their PRFs. The 30th range intervals have a "01" in PRF A and a "01" in PRF C. Thus, 01∧01=01, yielding a non-zero integer in the answer, and a target is designated.

Referring to FIG. 8, non-designated target return signal patterns are shown for two specific patterns. FIG. 8c is the digital representation of FIG. 8b. As to FIG. 8c, range interval 30 of PRF A has a "01" therein while range interval 30 of PRF C has a "10" therein. Thus Thus, 01∧10=00 which implies that no target is identified. The same results occur with reference to FIG. 7a.

Figure 9:
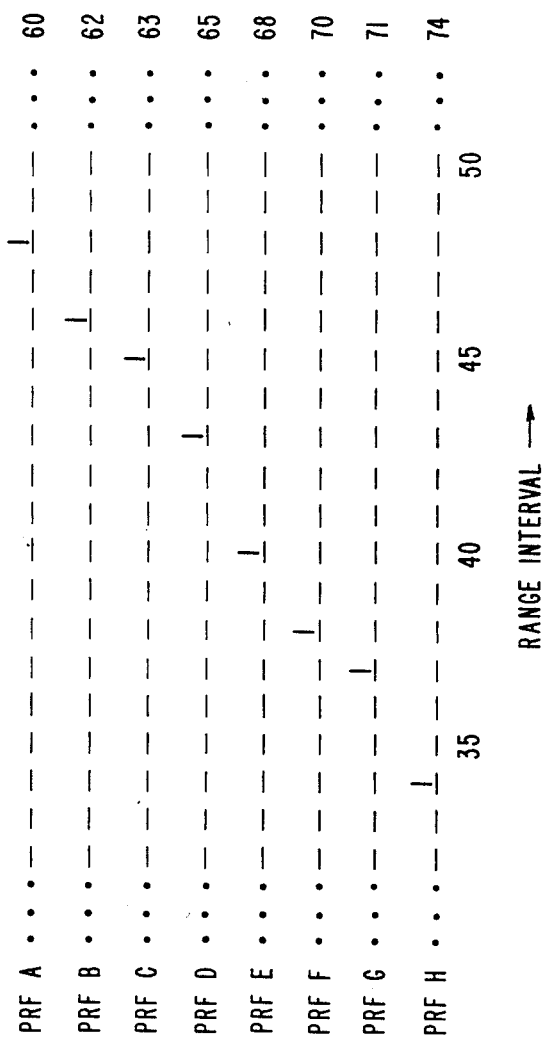
FIG. 9 presents target data for an eight PRF system which may implement the methods of the present invention.

The present method is not limited to three PRFs, nor is it limited to equal differences between the numbers of range intervals in the various PRFs. With reference to FIG. 9, there is shown an 8 PRF system which implements the method of the present invention. For clarity, the PRFs have been ordered in terms of increasing range interval count per PRF. Thus PRFs A-H have 60, 62, 63, 65, 70, 71 and 74 range intervals associated therewith in their respective interpulse periods as indicated by the numbers at the right of the figure.

The present method is implemented in the following manner. Choose, say, PRF E as the base PRF. A target return signal is located in rang interval 40 thereof. In the first correlation, range interval 40 of all PRFs is checked for target return signals, of which none are present. The second correlation requires that range interval 43 of PRF D be checked; range interval 45 or PRF C, range interval 46 of PRF B; range interval of 48 of PRF A; range interval 38 of PRF F; range interval 37 of PRF G; and range interval 34 of PRF H. The particular range interval checked in each PRF is determined by the difference in range intervals between the base PRF and any particular PRF. As seen in FIG. 9, target return signals are present in all PRFs and thus a target is designated and range calculated.

However, it may not be necessary to require that all target return signals of all PRFs correlate at one time and as is known in the art, radar blind zones may preclude this from happening. Under some conditions, it may be advantageous to declare a target when only three target return signals correlate. In addition, the two bit digital target digitizing scheme may be employed in a similar manner as described with reference to FIG. 6 hereinabove. Accordingly, the "ANDING" procedure may be employed to determine the presence of a target, but only requiring 3 out of 8 intervals to be "ANDED". In addition, the present method does not require the base PRF to be a specific PRF at all times. The base PRF may change from correlation to correlation which may allow for fewer computations. For example, the base PRF may be selected to be that represented by the most recently acquired data item.

Thus there has been described a range resolution method which is less complex, computationally faster and uses less storage than previously known techniques. The method is flexible, in that it may be used for any number of PRFs having any number of range intervals associated therewith.

For comparative purposes, Table 2 shows the number of computations required for the Chinese remainder theorem and shift register approaches and the present method, or straight line method, as a function of the number of targets viewed by a three PRF radar system.

| Number of Targets | Computations | | |
|---|---|---|---|
| | Chinese | Shift Reg. | Straight line |
| 1 | 18 | 1260 | 222 |
| 3 | 342 | 1800 | 270 |
| 5 | 1450 | 2340 | 318 |
| 10 | 10800 | 3690 | 438 |

It is to be understood that the above described embodiments of the invention are merely illustrative of the many possible specific embodiments which represent applications of the principles in the present invention. Numerous and varied other arrangements can readily be devised in accordance with these principles by those skilled in the art without departing from the spirit and scope of the invention.

What is claimed is:

1. A method of determining the range of a target for use in a radar system employing multiple pulse repetition frequencies (PRFs) and providing digitized signals indicative of target return signals from a plurality of range intervals, said method comprising the steps of:

(1) selecting one of said PRFs as a base PRF;

(2) selecting a second PRF and extending its number of range intervals by an amount equal to the difference in range intervals between said base and second PRFs times the number of PRF ambiguities that corresponds to the maximum target detection range;

(3) selecting a range interval having a digitized target return signal therein from the signals associated with said base PRF;

(4) correlating the range intervals associated with the second PRF by selecting range intervals of said remaining PRFs, based upon the differences between the number of range intervals in any particular PRF and that of the base PRF, to determine if target signals are present therein which satisfy a first predetermined relationship therebetween;

(5) calculating the range of the target, based on a second predetermined relationship and the information obtained in steps 1, 2, 3 and 4 above; and (6) repeating steps 4 and 5 for each of the remaining range intervals of said base PRF having digitized target return signals therein.

2. The method of claim 1 wherein said first predetermined relationship provides for a target to be identified when a preselected number of range intervals of said plurality of said PRFs contain target return signals during any one correlation.

3. THe method of claim 1, wherein said second predetermined relationship is defined by the range equation $R = B + N_r \cdot n$, where R is the range in range intervals, B is the range interval associated with the digitized target return signal selected from step 2 of claim 1, $N_r$ is the number of range intervals associated with said base PRF, and n is equal to the difference between the range interval of a target return signal in one of said plurality of PRFs minus the range interval of the selected target return signal of said base PRF, divided by the difference in range intervals between said one PRF and said base PRF.

4. The method of claim 1 wherein said multiple PRFs comprise three PRFs, the number of range intervals therein differing by an equal amount therebetween, and wherein said correlating is accomplished by selecting equally opposed range intervals from the second and third PRFs which are separated from said selected range interval of said base PRF by an integer multiple of said equal amount of in range intervals, to determine if target return signals are present therein.

5. A method of determining the range of a target for use in a radar system employing multiple pulse repetition frequencies (PRFs) and providing digitized signals indicative of target return signals from a plurality of range intervals, said method comprising the steps of:

(1) selecting one of said PRFs as a base PRF;

(2) selecting a second PRF and extending its number of range intervals by an amount equal to the difference in range intervals between said base and second PRFs times the number of PRF ambiguities that corresponds to the maximum target detection range;

(3) selecting a range interval having a digitized target return signal from the signals associated with said base PRF;

(4) correlating the range intervals associated with the second PRF by selecting range intervals of said remaining PRFs, based upon the differences between the number of range intervals in any particular PRF and that of the base PRF, to find specific target return signals therefrom which satisfy a first predetermined relationship between the range intervals thereof;

(5) calculating the range of the target, represented by said selected digitized target return signal, based on a second predetermined relationship and the information obtained in steps 1,2,3 and 4 above; and (6) repeating steps 4 and 5 for each of the remaining digitized target return signals associated with said base PRF having digitized target return signals therein.

6. The method of claim 1 wherein said second predetermined relationship is defined by the range equation $R = B + N_r \cdot n$, where R is the range in range intervals, B is the range interval associated with the digitized target return signal selected from step 2 of claim 1, $N_r$ is the number of range intervals associated with said base PRF, and n is equal to the difference between the range interval of a target return signal in one of said plurality of PRFs minus the range interval of the selected target return signal of said base PRF, divided by the difference in range intervals between said one PRF and said base PRF.

7. The method of claim 2 wherein said second predetermined relationship is defined by the range equation $R = B + N_r \cdot n$, where R is the range in range intervals, B is range interval associated with the digitized target return signal selected from step 2 of claim 1, $N_r$ is the number of range intervals associated with said base PRF, and n is equal to the difference between the range interval of a target return signal in one of said plurality of PRFs minus the range interval of the selected target return signal of said base PRF, divided by the difference in range intervals between said one PRF and said base PRF.

8. The method of claim 1 wherein the first predetermined relationship of said correlating step comprises:
   selected PRIs of said second PRF are correlated based upon the numerical difference in range intervals between said base and second PRFs.

9. The method of claim 1 wherein said first predetermined relationship provides for a target to be identified when a preselected number of range intervals of said plurality of said PRFs contain target return signals during any one correlation.

10. A method of determining the range of a target for use in a radar system employing multiple pulse repetition frequencies (PRFs) and providing digitized signals indicative of target return signals from a plurality of range intervals, said method comprising the steps of:

(1) selecting one of said PRFs as a base PRF;

(2) selecting the range interval having a digitized target return signal therein from the signals associated with said base PRF;

(3) correlating the range intervals associated with the remaining PRFs in a predetermined manner to find specific target return signal therefrom which satisfy a first predetermined relationship therebetween;

(4) calculating the range of the target, based on a second predetermined relationship and the information obtained in steps 1,2 and 3 above, and wherein said second predetermined relationship is defined by the range equation $R = B + N_r \cdot r$, where R is the range in range intervals, B is the range interval associated with the digitized target return signals selected from step 2, $N_r$ is the number of range intervals associated with said base PRF, and n is equal to the difference between the range interval of a target return signal in one of said plurality of PRFs minus the range interval of the selected target return signal of said base PRF, divided by the difference in range intervals between said one PRF and said base PRF; and (5) repeating steps 3 and 4 for each of the remaining range intervals of said base PRF having digitized target return signals therein.

11. The method of claim 10 wherein said multiple PRFs comprise three PRFs, the number of range intervals therein differing by an equal amount therebetween, and wherein said correlating is accomplished by selecting equally opposed range intervals from the second and third PRFs which are separated from said selected range interval of said base PRF by an integer multiple of said equal amount of in range intervals, to determine if target return signals are present therein.

12. A method of determining the range of a target for use in a radar system employing multiple pulse repetition frequencies (PRFs) and providing digitized signals indicative of target return signals from a plurality of range intervals, said method comprising the steps of:

(1) selecting one of said PRFs as a base PRF;

(2) selecting the range interval having a digitized target return signal therein from the signals associated with said base PRF;

(3) correlating the range intervals associated with the remaining PRFs by selecting range intervals of said remaining PRFs, based upon the differences between the number of range intervals in any particular PRF and that of the base PRF to find specific target return signal therefrom which satisfy a first predetermined relationship therebetween;

(4) calculating the range of the target, based on a second predetermined relationship and the information obtained in steps 1,2 and 3 above, and wherein said second predetermined relationship is defined by the range equation $R = B + N_r \cdot r$, where R is the range in range intervals, B is the range interval associated with the digitized target return signals selected from step 2, $N_r$ is the number of range intervals associated with said base PRF, and n is equal to the difference between the range interval of a target return signal in one of said plurality of PRFs minus the range interval of the selected target return signal of said base PRF, divided by the difference in range intervals between said one PRF and said base PRF; and (5) repeating steps 3 and 4 for each of the remaining range intervals of said base PRF having digitized target return signals therein.

13. A method of determining the range of a target for use in a radar system employing multiple pulse repetition frequencies (PRFs) and providing digitized signals indicative of target return signals from a plurality of range intervals, said method comprising the steps of:

(1) selecting one of said PRFs as a base PRF;

(2) selecting the range interval having a digitized target return signal therein from the signals associated with said base PRF;

(3) correlating the range intervals associated with the remaining PRFs in a predetermined manner to find specific target return signal therefrom which satisfy a first predetermined relationship therebetween and wherein said first predetermined relationship provides for a target to be identified when a preselected number of range intervals of said plurality of said PRFs contain target return signals during any one correlation;

(4) calculating the range of the target, based on a second predetermined relationship and the information obtained in steps 1,2 and 3 above and wherein said second predetermined relationship is defined by the range equation $R = B + N_r \cdot r$, where R is the range in range intervals, B is the range interval associated with the digitized target return signals selected from step 2, $N_r$ is the number of range intervals associated with said base PRF, and n is equal to the difference between the range interval of a target return signal in one of said plurality of PRFs minus the range interval of the selected target return signal of said base PRF, divided by the difference in range intervals between said one PRF and said base PRF; and (5) repeating steps 3 and 4 for each of the remaining range intervals of said base PRF having digitized target return signals therein.

14. A method of determining the range of a target for use in a radar system employing multiple pulse repetition frequencies (PRFs) and providing digitized signals indicative of target return signals from a plurality of range intervals, said method comprising the steps of:

(1) selecting one of said PRFs as a base PRF;

(2) selecting the range interval having a digitized target return signal therein from the signals associated with said base PRF;

(3) correlating the range intervals associated with the remaining PRFs by selecting range intervals of said remaining PRFs, based upon the differences between the number of range intervals in any particular PRF and that of the base PRF, to determine if target signals are present therein which satisfy a first predetermined relationship therebetween;

(4) calculating the range of the target, based on a second predetermined relationship and the information obtained in steps 1,2 and 3 above and wherein said second predetermined relationship is defined by the range equation $R = B + N_r \cdot r$, where R is the range in range intervals, B is the range interval associated with the digitized target return signals selected from step 2, $N_r$ is the number of range intervals associated with said base PRF, and n is equal to the difference between the range interval of a target return signal in one of said plurality of PRFs minus the range interval of the selected target return signal of said base PRF, divided by the difference in range intervals between said one PRF and said base PRF; and (5) repeating steps 3 and 4 for each of the remaining range intervals of said base PRF having digitized target return signals therein.

15. The method of claim 1 wherein the digitized signals indicative of target return signals comprise two bit binary codes, and wherein said correlating step comprises performing an AND operation on the two bit binary codes from each of the selected PRFs, and wherein a range bin is resolved if the AND operation results in an answer that is unequal to zero.

16. The method of claim 2 wherein the digitized signals indicative of target return signals comprise two bit binary codes, and wherein said correlating step comprises performing an AND operation on the two bit binary codes from each of the selected PRFs, and wherein a range bin is resolved if the AND operation results in an answer that is unequal to zero.

17. The method of claim 9 wherein the digitized signals indicative of target return signals comprise two bit binary codes, and wherein said correlating step comprises performing an AND operation on the two bit binary codes from each of the selected PRFs, and wherein a range bin is resolved if the AND operation results in an answer that is unequal to zero.

* * * * *